T. K. HANSBERRY.
MACHINE FOR EXTERMINATING GRASSHOPPERS.
No. 188,359. Patented March 13, 1877.
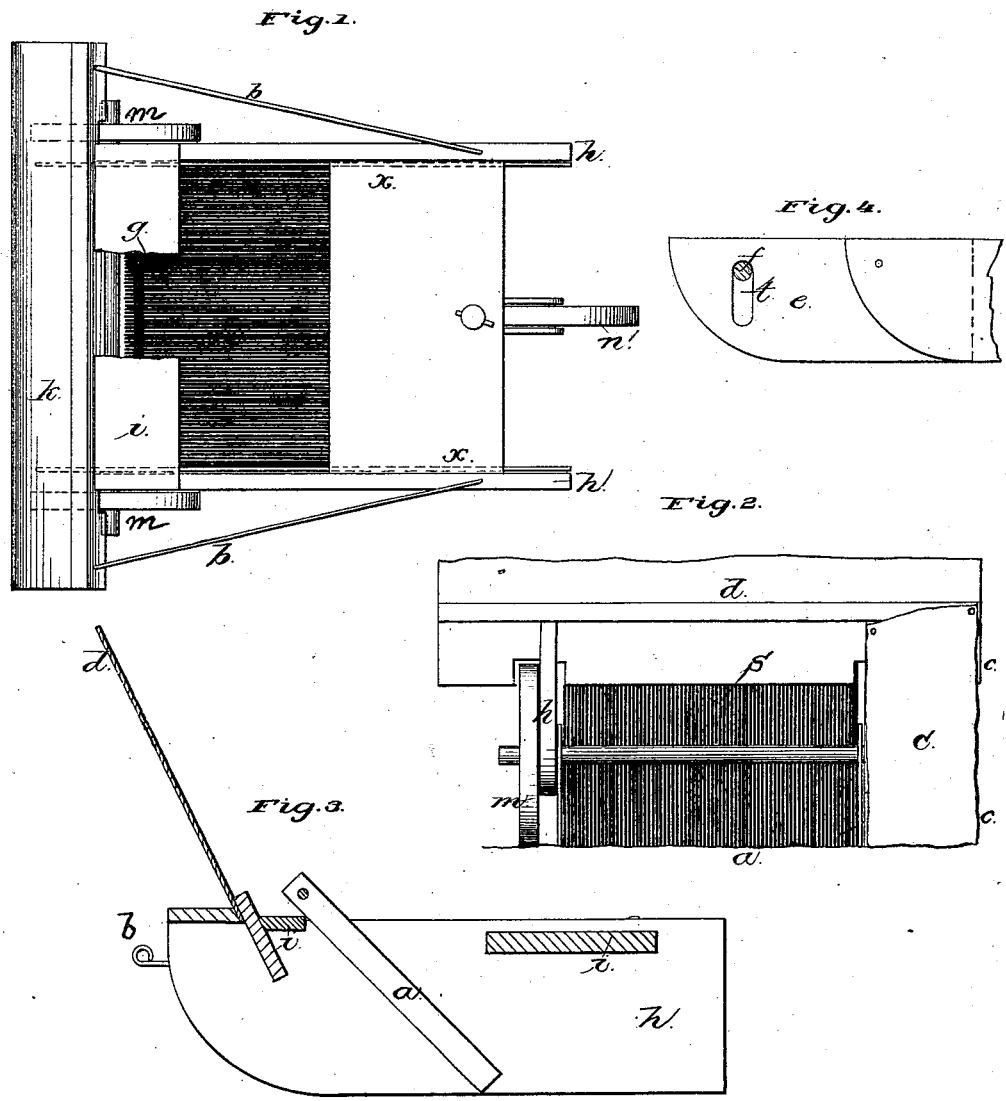

UNITED STATES PATENT OFFICE.

THOMAS K. HANSBERRY, OF PADONIA, KANSAS.

IMPROVEMENT IN MACHINES FOR EXTERMINATING GRASSHOPPERS.

Specification forming part of Letters Patent No. 188,359, dated March 13, 1877; application filed January 30, 1877.

*To all whom it may concern:*

Be it known that I, THOMAS K. HANSBERRY, of Padonia, Brown county, State of Kansas, have invented a new and useful Improvement for Exterminating Grasshoppers; and I do hereby declare that the following is a full, clear, and exact description thereof, which will enable others skilled in the mechanical arts to make and construct the same, reference being had to the accompanying drawing, and to the letters of reference marked thereon, which form a part of this specification, in which—

Figure 1 is a top view of my machine when mounted on wheels or on runners; Fig. 2, a front of the machine; Fig. 3, sectional side view of machine when on runners, with knives or bars attached. Fig. 4 shows slide attached to the axle to close the angle formed at 'the side by the ground and the knives or bars, when the machine is mounted on wheels.

The object of my invention is to furnish a machine so simple and so cheap of construction that any farmer of ordinary intelligence and skill may be able to construct the same at the least possible cost, thus affording the means of most effectually exterminating the grasshopper, locust, and army-worm, the pest of the farmers of any of the trans-Mississippi States.

The invention consists in the novel construction and arrangement of a system of knives or bars attached by one end on a pivot or hinge so as to hang at an angle from a suitable frame, while their opposite ends drag freely on the ground, accommodating themselves to the inequalities of the surface, and, as the machine moves forward, crushing and destroying the insects, (the frame may be mounted on wheels or on runners, as shown by Fig. 1 in the accompanying drawing;) also, in the slide or cover, Fig. 4, used, when the machine is mounted on wheels, to close the angle between the axle and the knives or bars laterally, and in other details of construction hereinafter claimed.

$a$ are the knives or bars, which may be constructed of wood or iron or of any other suitable material. Fig. 1, as already stated, shows the machine ready for operation. A section of the cross-bar $i$ of the frame in front is cut away to show in what manner the knives or bars may be attached to the frame $h$ $h$. The dotted lines $x$ $x$ indicate the place of the runners when the machine is to be operated without wheels. The rods $b'$ $b$ end with a hook, to which the draft is applied. To each of these hooks a horse is to be attached. The animals' heads are to be separated by a jockey-stick, so as to cause them to walk a little outside and in front of the line of the wheels or the runner. The animals will thus be separated from twelve to fifteen feet, and even eighteen feet, according to the width of the machine and its consequent destructive capacity. Each horse will be covered from the back down to the feet on the outside with a canvas cover to be attached to the harness. This canvas will extend to the rear and be connected to the canvas wings $c$ $c$, as shown in Fig. 2 in the drawing. When the horses are covered in this manner and attached to the machine as described the insects will be gathered and forced toward the center between the horses as the machine advances, where they will be caught and crushed by the knives or bars $a$, or cut to pieces when these bars are armed with steel blades at the ends. The hood or dash $d$, Fig. 3, is placed at the extreme front, above the throat $s$, after the manner of a dash on a one-horse sleigh, to catch any insect that might attempt to take wing as the machine moves forward. In attempting to rise they will come in contact with the hood or dash and be thrown to the ground, where they will be destroyed by the advancing knives or bars. The dash or hood may be made of wood, tin, sheet-iron, or any suitable material—even canvas may be used. To prevent the escape of the grasshopper laterally or at the side through the angle or space formed by the bars and the ground when the machine is mounted on wheels, the slide or cover $e$, Fig. 4, is employed attached to the axle $f$ with the slot $t$. The slide or cover may be jointed, as shown in the figure, or in a single piece. By being jointed it will have a single motion up and down, thus accommodating and adjusting itself to the inequalities of the ground. The upright parts of the frame $h$ are held in position by cross-pieces $i$, and in front is a cross-beam, $k$, which support may carry canvas wings $c$ $c$.

It will be readily understood that when my device is used without wheels it is supported upon runners or parts *h*, in which case the slide *e* is not used, but when used upon wheels *m* the slide *e* fills up the space otherwise occupied by the runners *h* and prevents the escape of the insect laterally. In the rear of the machine is a pivotal wheel, *n*, which supports a portion of the weight of the frame and renders the machine easily turned in any direction.

It will be evident that the knives or bars *a* may be greatly modified or changed in construction without departing from the spirit of my invention, as, for instance, they might be armed with steel blades at their bearing on the ground to cut up as well as crush the insects. They might be hinged in groups or in sections. Sufficient weight may be given to each particular knife or bar by a spring or by loading them. It is believed they should be pivoted, as this will give the heaviest bearing at the point of contact on the ground.

As my device is drawn along either on wheels or on runners, as may be most convenient, and according to the particular mode of construction, the insects are gathered into the space between the horses and between the runners *h* or the slide *e*, where they are crushed and destroyed by the knives or bars *a*, the knives or bars also accommodating themselves to the configuration of the ground, easily passing over obstructions, and rendering it almost impossible for the insect to escape destruction. The knives or bars *a* are held in place by a rod, *g*, passing through a hole in the ends of each, the rod passing through the sides of the frame *h h*, in which it is secured by means of suitable fastening.

It is obvious that a machine of this class, made of small size, may be operated by hand or by one horse, and that the knives or bars may be raised and lowered at pleasure by any of the ordinary means.

Having, as above, fully described my device, what I claim is—

1. In a machine for exterminating grasshoppers or the army-worm, a system of hinged or pivoted knives or bars adapted to accommodate themselves to the inequalities of the ground, and to crush the insect, substantially as described.

2. The combination of the pivotal knives or bars *a*, the side wheels *m*, and the slides *e*, as described.

3. The apparatus herein described, consisting essentially of a frame, *h i*, wheels *m*, pivotal knives or bars *a*, support *k*, carrying collectors *c c*, and hood or dash *d*, as and for the purposes set forth.

T. K. HANSBERRY.

Witnesses:
 HENRY ISEBY,
 W. B. BARNETT.